United States Patent [19]

Wachter

[11] Patent Number: 5,195,756
[45] Date of Patent: Mar. 23, 1993

[54] LIVE-LOAD DEVICE

[75] Inventor: William J. Wachter, Wexford, Pa.

[73] Assignee: Electric Power Research Institute, Palo Alto, Calif.

[21] Appl. No.: 703,009

[22] Filed: May 20, 1991

[51] Int. Cl.[5] .......................... F16J 15/18; F16F 1/34; F16F 1/20; F16B 43/00

[52] U.S. Cl. .................................... 277/106; 267/161; 267/162; 251/214; 411/11; 411/544

[58] Field of Search ................ 277/106; 267/158, 161, 267/162, 163; 251/214; 411/9, 10, 11, 544

[56] References Cited

U.S. PATENT DOCUMENTS

| | | | |
|---|---|---|---|
| 464,301 | 1/1891 | Harvey | 411/544 X |
| 1,826,415 | 10/1931 | Bragg et al. | 267/161 X |
| 1,889,397 | 11/1932 | Baumheckel | 267/161 X |
| 1,929,009 | 10/1933 | Williams | 411/544 X |
| 2,369,865 | 2/1945 | Spencer | 411/11 |
| 2,464,152 | 3/1949 | Ralston | 411/11 |
| 2,565,108 | 8/1951 | Zahodiakin | 267/162 |
| 2,747,166 | 5/1956 | Hoffarth | 267/161 X |
| 3,187,621 | 6/1965 | Turner | 411/10 |
| 3,259,383 | 7/1966 | Johnson et al. | 267/161 |
| 3,519,096 | 7/1990 | Lunzer | 267/162 X |
| 3,951,393 | 4/1976 | Smirl | 267/161 |
| 4,043,546 | 8/1977 | Ashfield et al. | 267/162 |
| 4,668,106 | 5/1987 | Gu | 267/161 |
| 4,871,181 | 10/1989 | Usher et al. | 277/106 X |
| 4,968,010 | 11/1990 | Odobasic | 267/162 |
| 5,024,453 | 6/1991 | Suggs | 267/162 X |

FOREIGN PATENT DOCUMENTS

| | | | |
|---|---|---|---|
| 0463551 | 7/1928 | Fed. Rep. of Germany | 267/161 |
| 0528546 | 7/1930 | Fed. Rep. of Germany | 267/161 |
| 2202111 | 1/1972 | Fed. Rep. of Germany | 267/162 |
| 0161910 | 5/1933 | Switzerland | 267/162 |

Primary Examiner—William A. Cuchlinski, Jr.
Assistant Examiner—James K. Folker
Attorney, Agent, or Firm—Leonard Bloom

[57] ABSTRACT

A live-load device for applying a compressive force to packing or gasket material in a valve or pipe conduit junction. The device incorporates spring-washers having resilient blades for imparting a spring force. The spring force is transmitted from each blade through a ball-bearing seated at a selected one of a plurality of contact points along the blade tip. The spring constant of the device is selected by positioning the ball-bearing at a particular one of the contact points. This adjustment capability makes the spring device universally adaptable to a wide variety of valves and conduit junctions.

43 Claims, 4 Drawing Sheets

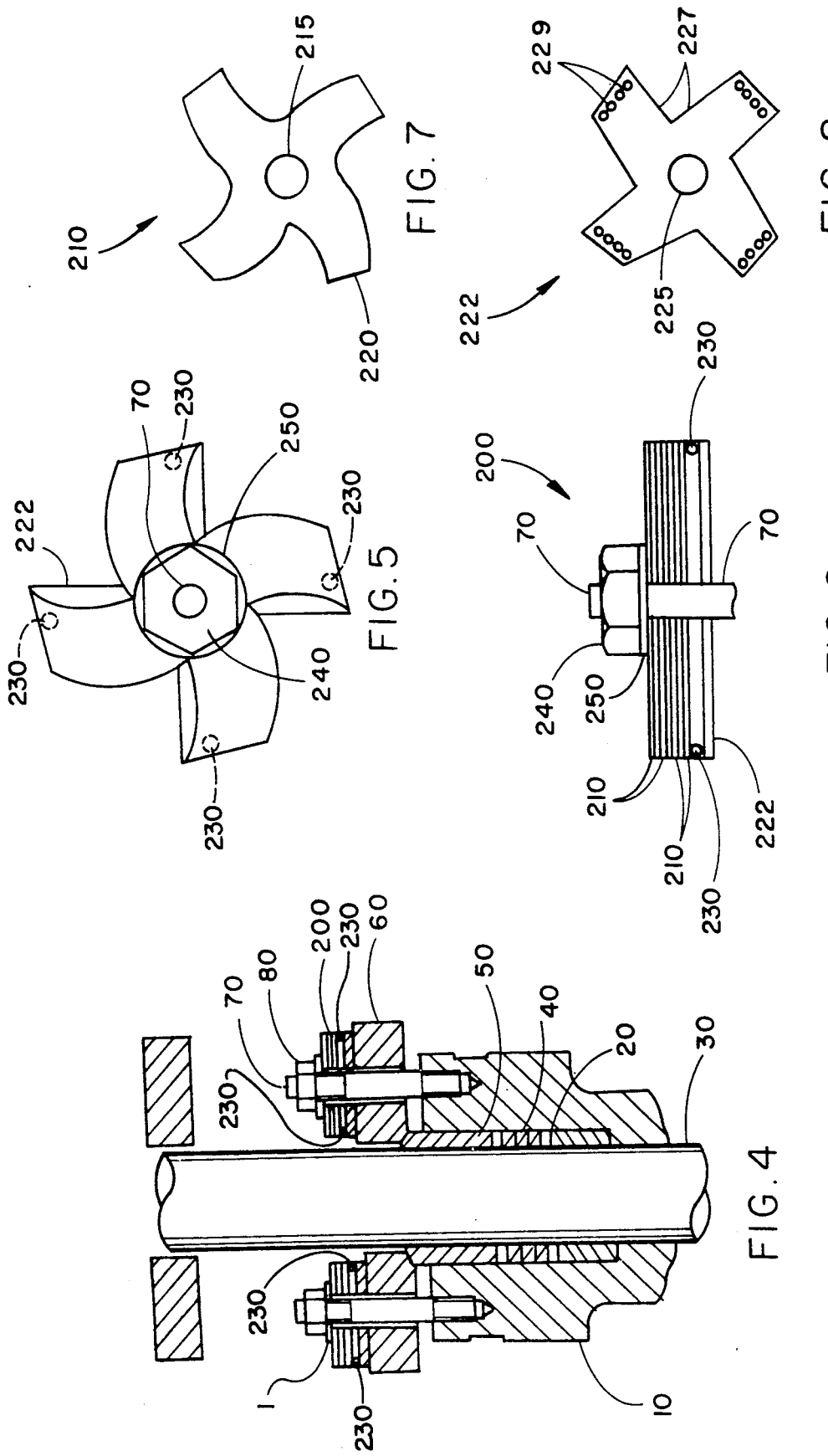

LIVE-LOAD DEVICE

BACKGROUND OF THE INVENTION

1. Field of the Invention

The present invention relates to pipe joints and valves and, more particularly, to a device for imparting a live-load to gaskets or packing material for improving the seal around pipe joints and valves.

2. Description of the Background

There are thousands of valves and pipe joints operating in the numerous piping systems both inside and outside of nuclear power plants. The need for a proper seal in such pipe joints and valves is self-evident. If leaks develop, they may well result in radioactive exposure of personnel. Furthermore, steam production is quite expensive, costing approximately $3.40 per 1000 pounds. A small leak in a single steam valve can waste over $5000.00 in energy costs per year.

Such leaks are typically avoided by employing gaskets between pipe joints and resilient packing material around valve stems. Unfortunately, conventional gasket and packing material gradually lose resiliency over time and become permanently deformed. Permanent deformation (a.k.a. "creep") of the gasket or packing material must be compensated for by maintenance procedures including routine tightening of the studs clamping the gasket or packing material. The studs are tightened regularly until all resiliency is gone, at which point the packing material must be replaced. These maintenance procedures have proven to be time-consuming, costly, and a dangerous source of radiation exposure in radioactive areas.

It is well-known that a spring device can be used to compensate for creep, thereby eliminating the need to tighten the studs regularly over the life of the packing material. The spring device imparts a constant compressive force to the gasket or packing which compensates for the resiliency normally lost to creep. The seal provided by the packing or gasket will remain stable until the time when replacement is required. Consequently, much of the maintenance is eliminated. The use of a spring-device as described above is known as "live-loading" pipe joints and valves.

A commonly used spring device for imparting a live-load is known as the Belleville washer stack (BWS).

FIG. 1 illustrates a prior art live-load system for a valve. The system incorporates a Belleville washer stack 90.

As shown in FIG. 1, the live-load system includes a valve housing 10 having a central valve chamber 20. A valve stem 30 projects through valve chamber 20. An upper portion of the valve chamber 20 has a radius which is larger than the radius of the valve stem 30. This leaves a clearance between the valve chamber 20 and valve stem 30 for accommodating a layer of packing material 40 encircling valve stem 30. An annular gland collar 50 likewise encircles valve stem 30 above packing material 40. Gland collar 50 is slidable along valve stem 30 for compressing packing material 40 within valve chamber 20. An annular gland flange 60 also encircles valve stem 30 above housing 10. Gland flange 60 is likewise slidable along valve stem 30, and bears against gland collar 50 in order to force gland collar 50 against packing material 40. Flange 60 is formed with a number of bore holes spaced evenly around the periphery. A corresponding number of gland studs 70 are threaded into valve housing 10, each protruding upward, in parallel to valve stem 30, through a bore hole in flange 60.

A stack 90 of individual Belleville washers 100 are mounted on stud 70, and a gland nut 80 is screwed to the tip of each stud 70. Each stack of washers 90 is sandwiched between a gland nut 80 and flange 60.

FIGS. 2 and 3 illustrate a top view and a side view, respectively, of an individual Belleville washer 100 of the type commonly used in a live-load system as in FIG. 1.

As shown in FIGS. 2 and 3, each Belleville washer comprises a convex annular disk having a central aperture 110.

Referring back to FIG. 1, pairs of opposing disks 100 are aligned top to bottom on studs 70 to form a resilient Belleville stack 90.

In operation, stack 90 imposes a spring force on flange 60, which in turn urges gland collar 50 into packing material 40, thereby compressing the packing material 40 within valve chamber 20.

The above-described "live-load" system provides a superior seal. Moreover, the compressive force on packing material 40 is uniformly maintained over time to accommodate creep.

Unfortunately, the standard dimensions of valves and conduits often make installation of the Belleville washer stack 90 difficult or impossible. It is necessary to replace certain valve parts with custom parts to accommodate a Belleville spring device. Moreover, the proximity of studs 70 to valve stem 30 leaves little room for a Belleville washer 100. Valves smaller than two inches cannot be outfitted with Belleville washers due to a lack of space around studs 70. For larger valves, various sizes of Belleville washers must be kept on hand to fit each of the standard valve sizes. In addition, different valves require different spring constants. Hence, the Belleville washer stack 90 must be customized in accordance with the valve type to provide the proper spring constant.

SUMMARY OF THE INVENTION

It is therefore an object of the present invention to provide a live-load washer which is dimensioned to fit all known valve sizes, and which can be retrofit to a variety of valves and conduits without modification or replacement of parts.

It is still another object of the present invention to provide a live-load system utilizing a minimum number of parts which eliminates the need for costly and dangerous maintenance procedures.

It is a further object of the invention to provide a live-load system which gives a measurable indication of the creep of the packing over the life of the valve.

According to the present invention, the above-described and other objects are accomplished by providing a live-load system for maintaining a compressive load on valve and conduit packing material. The system comprises a number of spring-washers each having a hub defined by a central aperture for mounting the washers on valve studs. Each washer has a plurality of integral resilient blades equally spaced around a periphery of the hub and extending radially therefrom. The blades are of uniform length and curvature from the hub, and they impart an opposing spring force to any surface brought into compressive contact therewith.

BRIEF DESCRIPTION OF THE DRAWINGS

Other objects, features and advantages of the present invention will become more apparent from the following detailed description of preferred embodiments and certain modifications thereof when taken together with the accompanying drawings, in which like reference numerals represent like components:

FIG. 4 illustrates a valve system incorporating a live-load device according to one embodiment of the present invention.

FIGS. 5 and 6 illustrate a top view and cross-sectional view, respectively, of the live-load device of FIG. 4.

FIG. 7 illustrates a top view of the live-load spring-washer 210 of the embodiment of FIG. 4.

FIG. 8 illustrates a top view of the live-load base washer 222 of the embodiment of FIG. 4.

DETAILED DESCRIPTION OF THE PREFERRED EMBODIMENTS

FIG. 4 illustrates a valve incorporating a live-load system according to one embodiment of the present invention. A live-load device 200 is mounted on each gland stud 70 which projects upward from housing 10.

Figure 2:
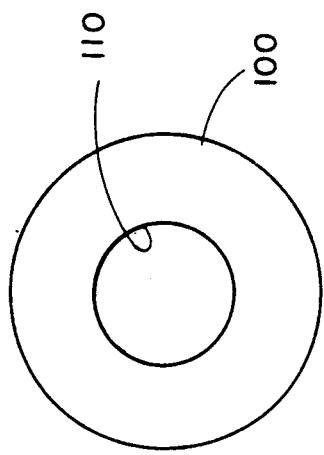
FIGS. 2 and 3 illustrate a top view and a side view, respectively, of an individual Belleville washer 100 of the type commonly used in the live-load system of FIG. 1.
Figure 3:
Figure 1:
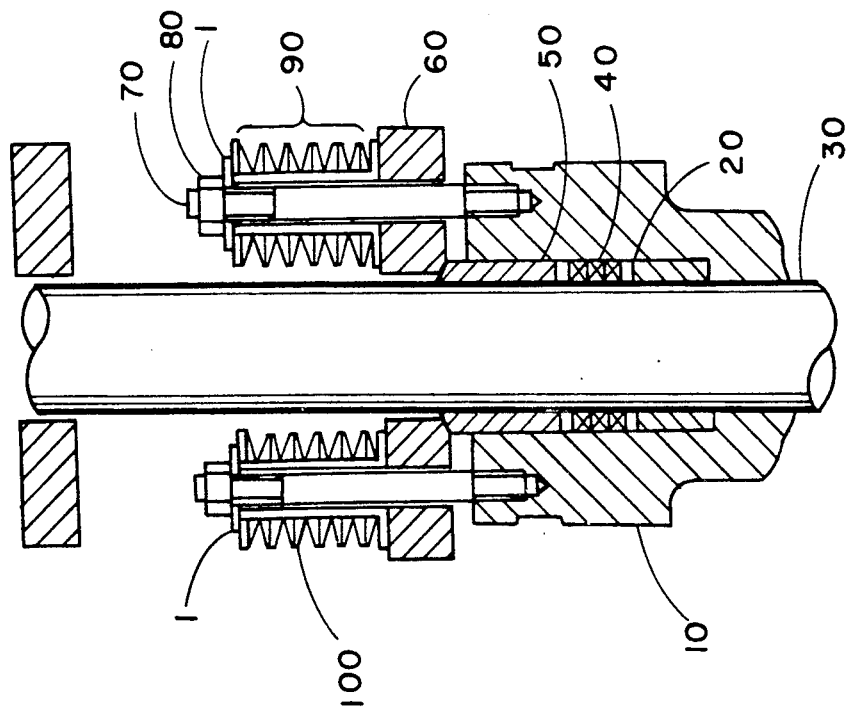
FIG. 1 illustrates a prior art live-load system for a valve.
Figure 10:
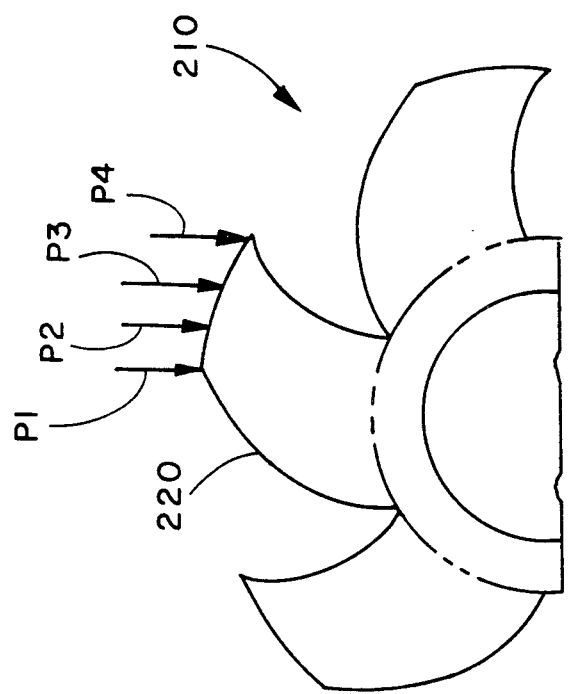
FIGS. 9 and 10 diagram the vertical and horizontal curvature, respectively, and the contact points P1-4 of a spring-washer blade 210.

FIGS. 5 and 6 illustrate the live-load devices 200 of FIG. 1 in more detail. Preferably, each live-load device 200 comprises a stack of spring-washers, however, a single spring-washer 210 may be used. Each live-load device 200 also comprises a base washer 222, and a plurality of ball-bearings 230 sandwiched between the spring-washers 210 and base washer 222. A nut 240 is threaded to the tip of each stud 70, and is seated on an underlying washer 250. Nut 240 and washer 250 urge spring-washers 210 against ball bearings 230 and toward base washer 222. Spring-washers 210 and base washer 222 slide freely along gland stud 70.

FIG. 7 illustrates a top view of a spring-washer 210 according to the preferred embodiment of the invention. As shown, spring-washer 210 comprises a central hub defined by a central aperture 215 and a plurality of resilient blades 220 extending radially from the hub. The spring blades 220 of each spring-washer 210 are preferably of uniform length. It is also preferred that the spring blades 220 are provided with a horizontal degree of curvature outward from the hub, and have a uniform radius of curvature with respect to the hub. However, it should be noted that only one of the edges (leading or trailing) of spring blade 220 need be curved to achieve the intended result.

FIG. 8 illustrates the base washer 222 according to the preferred embodiment of the invention. As shown, base washer 222 also comprises a central hub with a plurality of blades 227 extending radially therefrom.

The bladed configuration of spring device 200 resolves the spatial constraints resulting from the proximity of stud 70 to valve stem 30. Valve stem 50 fits conveniently between adjacent blades 210.

A number of cavities 229 are aligned along base washer 222 at the tip of each blade 227. In the embodiment shown, four cavities 229 are aligned across the tip of each base-washer blade 227 to provide a four-position adjustable seating for a ball-bearing 230. A single ball-bearing 30 is seated within one of the cavities 229 between each spring-washer blade 220 and base-washer blade 227. Each ball bearing 230 serves as a contact point for the corresponding blade 220 of spring-washer 210.

It should be noted that the described embodiment uses four blades 220 on each of the spring-washers 210 and base washer 222. However, any number of blades 220 may be used.

In operation of the above-described live-load system, spring-washers 210 collectively impart a downward spring force which is transmitted through bearings 230, base washer 222, flange 60 and gland collar 50 to packing material 40. The spring force maintains the proper compression on packing material 40 throughout the life of the valve.

A primary advantage of the above-described invention lies in the ability to adjust the spring constant.

Figure 9:
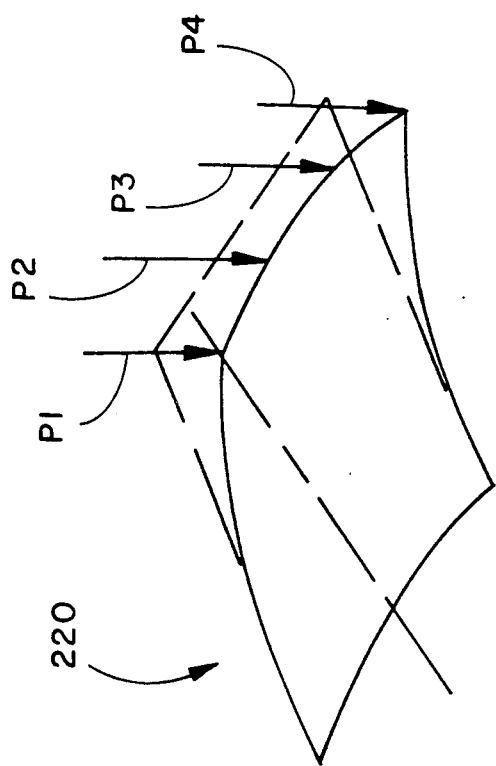

FIG. 9 details the above-described adjustment. As shown, each blade 220 of spring washer 210 is involute, e.g., formed with a slight curvature along its length. The curvature is equal on all blades 220. The curvature is necessary to impart a torsion to each blade 220 when spring-washer 210 is compressed against base-washer 222. During installation of spring-device 200, the blades 220 of spring-washer 210 are maintained in alignment with the corresponding blades 227 of base-washer 222. A ball-bearing 230 is seated in one of the cavities 229 at the tip of each base-washer blade 227. The particular cavity 229 in which ball-bearing 230 is seated determines whether P1, P2, P3 or P4 serves as the contact point.

The spring constant of spring-washer blade 220 depends on which contact point P1-P4 is selected, hence ball-bearing 230 may be shifted within cavities 229 to adjust the spring constant of the spring device 200.

More specifically, the spring constant of spring-washer blade 220 is a composite of two components. The first is a lateral component which is uniform for all lateral deflection of the blade 220. The second is a non-uniform torsional component. For any fixed lateral deflection, the torsional component of the spring constant will vary in accordance with the moment of blade 220 around fulcrum f. The moment is different for each of the contact points P1-P4, and depends on the perpendicular distance of the contact point from fulcrum f. The moment increases as the perpendicular distance grows larger (as blade 220 curves away from fulcrum f). Hence, the moment is greatest at contact point P4 and lowest (preferably zero) at point P1.

Likewise, the spring constant is greatest when ball-bearing 230 is seated at contact point P1, and is lowest when ball-bearing 230 is seated at contact point P4. Consequently, the stiffness of the blade 220 can be incrementally increased by moving ball-bearing 230 from contact point P4 toward contact point P1. In this manner, the stiffness can be adjusted prior to installation to suit the requirements of a wide variety of valves and conduits.

In sum, the convenient shape of spring device 200 in combination with the adjustable spring constant eliminates the need for expensive custom spring devices tailored to each particular valve type and size. The spring device 200 can be easily retrofit to an existing valve without modification of existing components. Once the spring constant is selected and set, the proper load is automatically applied to the packing, and no further maintenance will be required over the life of the packing material 40.

Furthermore, a visual indication of the amount of creep which has already occurred can easily be obtained. When the spring device 200 is first installed and there has been no creep, the hub of spring-washer 210 will sit flush against the hub of base washer 222. However, as time passes and creep gradually occurs, a clearance will appear between the hub of spring-washer 210 and the hub of base washer 222. The degree of clearance serves as a convenient visual indication of the amount of creep. Moreover, the clearance can easily be measured with a feeler gauge to provide a more accurate indication.

Figure 11:
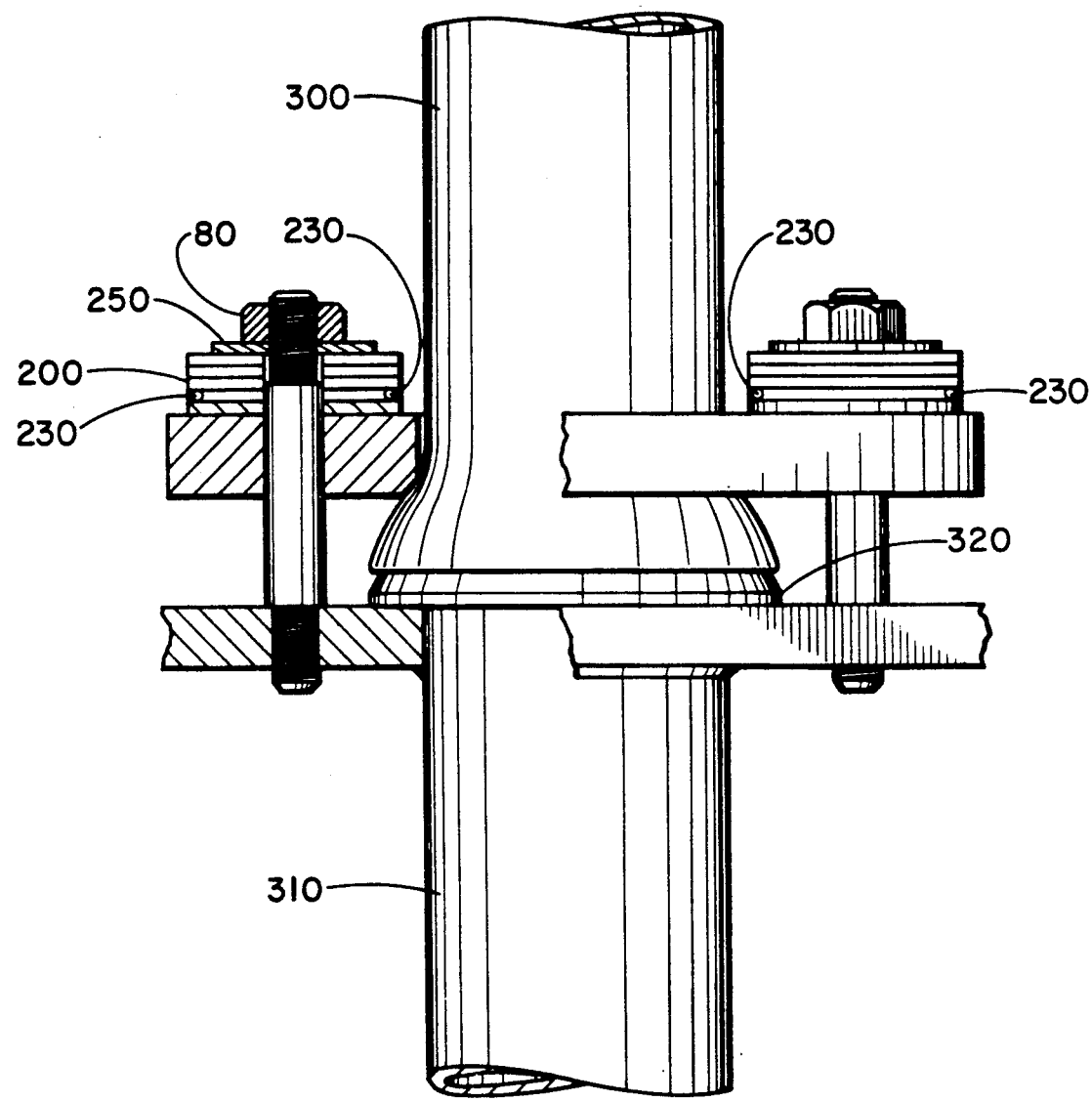
FIG. 11 illustrates an alternative use for the live-load device of the present invention in coupling a pipe joint.

FIG. 11 illustrates an alternative use for the live-load device of the present invention in a conventional coupling of pipe sections 300 and 310. The gasket material 320 or grommet which is commonly used in such pipe-joint couplings likewise tends to lose resiliency over time. The live-load device 200 of the present invention is equally effective at compensating for the creep of the gasket material 320.

Having now fully set forth the preferred embodiments and certain modifications of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

I claim:

1. A spring device for maintaining a compressive load, comprising:
at least one spring-washer having a central hub defined by a central aperture for retaining said washer on a stud, and a plurality of integral resilient blades equally spaced around a periphery of said central hub and extending radially therefrom, said blades having a uniform length and curvature from a plane of said hub, and each blade having a curved leading edge defining an involute in the plane of said hub, whereby said blades impart a spring force to a surface brought into compressive contact therewith.

2. The spring device according to claim 1, wherein said plurality of blades further comprises two blades.

3. The spring device according to claim 1, wherein said plurality of blades further comprises four blades.

4. The spring device according to claim 1, wherein said plurality of blades further comprises five blades.

5. The spring device according to claim 1, wherein said plurality of blades each have a curved trailing edge opposite to said leading edge and defining an involute in the plane of said hub.

6. The spring device according to claim 1, wherein said at least one spring-washer further comprises a plurality of spring-washers coaxially arranged in a stack.

7. The spring device according to claim 1, wherein said at least one spring-washer maintains a live-load on a gasket in a pipe-joint.

8. The spring device according to claim 1, wherein said at least one spring-washer maintains a live-load on packing material in a valve.

9. A spring device for maintaining a compressive load, comprising:
a spring-washer having a central hub defined by a central aperture for retaining said washer on a stud, and a plurality of integral resilient blades equally spaced around a periphery of said central hub and extending radially therefrom, said blades having a uniform length and each blade having a curved leading edge defining an involute along a plane of said hub;
a base-washer defined by a central aperture and mounted coaxially with said spring-washer to provide a support surface for said spring-washer blades;
a plurality of ball bearings each interposed between said base-washer and a blade of said spring-washer; and
whereby said spring-washer imparts an opposing spring force through said ball-bearings to said base-washer when compressed therewith.

10. The spring device according to claim 9, wherein said base-washer comprises a central hub defined by a central aperture, and a plurality of blades extending radially from said hub, and each base-washer blade provides a support surface for a corresponding blade of said spring-washer.

11. The spring device according to claim 9, wherein said plurality of spring-washer blades comprises two blades, and said plurality of base-washer blades comprises two blades.

12. The spring device according to claim 9, wherein said plurality of spring-washer blades comprises four blades, and said plurality of base-washer blades comprises four blades.

13. The spring device according to claim 9, wherein said plurality of spring-washer blades comprises five blades, and said plurality of base-washer blades comprises five blades.

14. The spring device according to claim 9, wherein said plurality of spring-washer blades each have an involute curved trailing edge opposite to said leading edge.

15. The spring device according to claim 9, wherein said spring-washer further comprises a plurality of spring washers coaxially arranged in a stack on said stud.

16. The spring device according to claim 9, wherein said spring-washer maintains a live-load on a gasket in a pipe-joint.

17. The spring device according to claim 9, wherein said spring-washer maintains a live-load on packing material in a valve.

18. A spring device for maintaining a compressive load, comprising:
a spring-washer having a central hub defined by a central aperture for retaining said spring-washer on a stud, and a plurality of integral resilient blades equally spaced around a periphery of said central hub and extending radially therefrom, said blades having a uniform length and curvature;
a base-washer mounted coaxially with said spring-washer, said base-washer further comprising a central hub defined by a central aperture, and a plurality of equally spaced blades extending radially from said hub, each base-washer blade corresponding to one of said spring-washer blades, and each base-washer blade being defined by a plurality of cavities proximate the tip; and a plurality of ball bearings, each ball bearing being seated in a corresponding one of said cavities proximate the tip of said base washer blade to provide bearing contact with said corresponding spring-washer blade;

whereby said spring-washer blades impart an opposing spring force to the corresponding blades of said base-washer through said ball-bearings when said spring-washer is compressed against said base-washer.

19. The spring device according to claim 18, wherein said plurality of spring-washer blades comprises two blades, and said plurality of base-washer blades comprises two blades.

20. The spring device according to claim 18, wherein said plurality of spring-washer blades comprises four blades, and said plurality of base-washer blades comprises four blades.

21. The spring device according to claim 18, wherein said spring-washer blades each have an involute curved leading edge.

22. The spring device according to claim 21, wherein a spring constant of said spring device may be adjusted by selecting a particular one of said cavities in which said ball bearing is seated.

23. The spring device according to claim 20, wherein said spring-washer maintains a live-load on a gasket in a pipe-joint.

24. The spring device according to claim 20, wherein said spring-washer maintains a live-load on packing material in a valve.

25. The spring device according to claim 24, wherein an amount of creep of said packing material may be determined by a degree of clearance occurring between said spring-washer hub and base-washer hub.

26. A valve, comprising:

a valve housing defined by a central valve chamber;
a valve stem extending through said valve chamber;
packing material ensheathing a portion of said valve stem within said valve chamber;
a gland for compressing said packing material within said valve chamber, said gland further comprising,
 a collar encircling said valve stem and slidable along said valve stem for compressing said packing material, and
 a flange bearing against said collar;
a plurality of gland studs attached at one end to said valve chamber and extending therefrom, through said flange, in parallel with said valve stem,
a plurality of gland nuts each threaded to another end of one of said gland studs,
a plurality of spring devices, at least one of said spring devices being mounted on a gland stud between said gland nut and flange for maintaining a compressive load on said packing material, said spring devices further comprising,
 at least one spring-washer having a central hub defined by a central aperture for retaining said washers on said gland studs, and a plurality of integral resilient blades equally spaced around a periphery of said central hub and extending radially therefrom, said blades having a uniform length and each blade having a curved leading edge defining an involute along a plane of said hub for imparting an opposing spring force to a surface brought into compressive communication therewith, and
 a plurality of ball bearings each interposed between a blade of one of said spring-washers and a support surface.

27. The valve assembly according to claim 26, wherein said at least one spring-washer maintains a live-load on said packing material.

28. The valve assembly according to claim 26, wherein said plurality of spring-washer blades each have an involute curved trailing edge opposite to said leading edge.

29. The valve assembly according to claim 26, wherein said at least one spring-washer further comprises a plurality of spring-washers coaxially stacked on each gland stud.

30. The valve assembly according to claim 26, wherein each of said spring devices further comprises,
a base-washer defined by a central aperture and mounted coaxially beneath a corresponding spring-washer to provide a support surface for said spring-washer blades, and
a plurality of ball bearings each interposed between said base-washer and a blade of one of said spring-washers;
whereby said spring-washer imparts an opposing spring force through said ball bearings to said base-washer when compressed therewith.

31. The valve assembly according to claim 26, wherein said base-washer comprises a central hub defined by a central aperture, and a plurality of blades extending radially from said hub, whereby each base-washer blade provides a support surface for a corresponding spring-washer blade.

32. The valve assembly according to claim 31, wherein each of said spring-devices further comprises,
a plurality of ball bearings, each ball bearing being sandwiched between a spring-washer blade and said base-washer for providing bearing contact therebetween;
whereby the blades of said spring-washer impart an opposing force to said base-washer through said ball-bearings when said spring-washer is compressed against said base-washer.

33. The valve assembly according to claim 32, wherein each base-washer comprises a central hub defined by a central aperture, and a plurality of equally spaced blades extending radially from said hub, and each base-washer blade corresponds to one of said spring-washer blades.

34. The valve assembly according to claim 33, wherein said base-washer is defined by a plurality of cavities proximate the tip of each blade for seating one of said ball-bearings;
whereby the blades of said spring-washer impart an opposing force to the corresponding blades of said base-washer through said ball-bearing when said spring-washer is compressed against said base-washer.

35. The valve assembly according to claim 34, wherein said spring-washer blades each have an involute curved trailing edge opposite to said leading edge.

36. The valve assembly according to claim 35, wherein a spring constant of said spring device may be adjusted by selecting a particular one of said cavities in which said ball bearing is seated.

37. The valve assembly according to claim 36, wherein said plurality of spring devices maintains a live-load on said packing material.

38. The valve assembly according to claim 37, wherein an amount of creep of said packing material may be determined by a degree of clearance occurring between said spring-washer hub and base-washer hub.

39. A spring device for maintaining a live-load on a gasket in a pipe-joint, comprising:
   at least one spring-washer having a central hub defined by a central aperture for retaining said washer on a stud, and a plurality of integral resilient blades equally spaced around a periphery of said central hub and extending radially therefrom, said blades having a uniform length and curvature from a plane of said hub, and each blade having a curved leading edge defining an involute in the plane of said hub, whereby said blades impart a spring force to a surface brought into compressive contact therewith.

40. A spring device for maintaining a compressive load, comprising:
   a spring-washer having a central hub defined by a central aperture for retaining said spring-washer on a stud, and a plurality of integral resilient blades equally spaced around a periphery of said central hub and extending radially therefrom, said blades having a uniform length and each having a curvature defining an involute along a plane of said hub;
   a base-washer mounted coaxially with said spring-washer, said base-washer further comprising a central hub with a central aperture and a plurality of equally spaced blades each corresponding to one of said spring-washer blades and extending radially from said hub, a tip of each base-washer blade being provided with a plurality of cavities; and
   a plurality of ball bearings, each ball bearing being seated between a corresponding spring-washer blade and said hub-washer to provide bearing contact therebetween;
   whereby said spring-washer blades impart an opposing spring force to the corresponding blades of said base-washer through said ball bearings when said spring-washer is compressed against said hub-washer, and a spring constant of said spring device may be adjusted by selecting a particular one of said cavities in which said ball bearing is seated.

41. A valve, comprising:
   a valve housing defined by a central valve chamber;
   a valve stem extending through said valve chamber;
   a plurality of gland studs attached to said valve chamber and extending therefrom parallel to said valve stem;
   a plurality of gland nuts each screwed to a corresponding one of said gland studs;
   a plurality of spring devices, at least one of said spring devices being mounted on each of said gland studs between said gland nut and valve chamber for maintaining a compressive load, said spring devices further comprising,
      at least one spring-washer having a central hub defined by a central aperture for retaining said washers on said gland studs, and
      a plurality of integral resilient blades extending radially around a periphery of said central hub for imparting an opposing spring force to a surface brought into compressive communication therewith, said blades being equally spaced around said central hub by an interval which is sized to at least partially receive said valve stem and neighboring gland studs and wherein said plurality of spring washer blades each have a curved leading edge defining an involute in the plane of said hub.

42. The valve assembly according to claim 41, wherein said plurality of spring-washer blades each have a curved trailing edge opposite said leading edge defining an involute in the plane of said hub.

43. The valve assembly according to claim 41, wherein said at least one spring-washer further comprises a plurality of spring-washers coaxially stacked on each gland stud.

* * * * *